Jan. 10, 1933.　　　A. J. DOTTERWEICH　　　1,893,933
WATER SOFTENING APPARATUS
Filed June 7, 1929
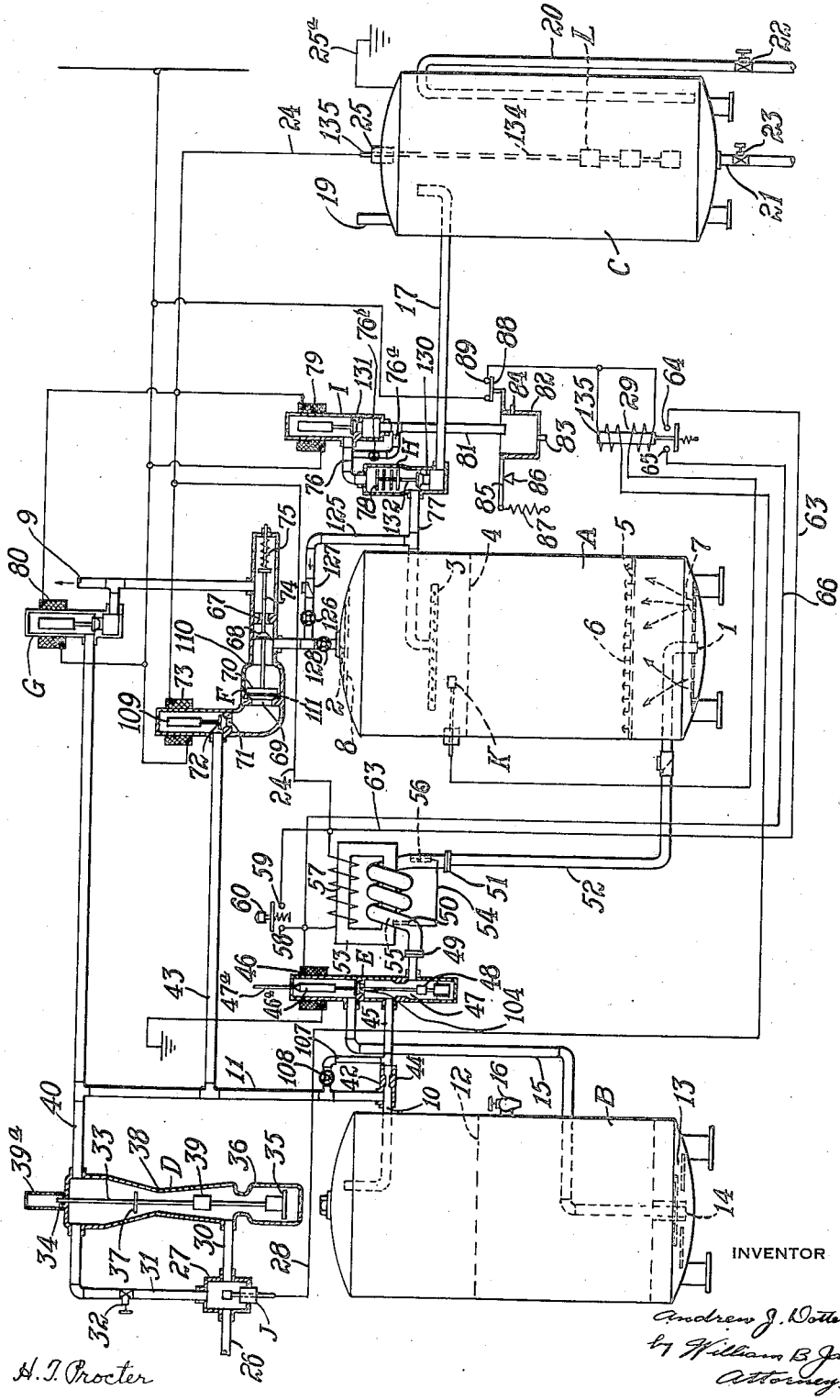
INVENTOR
Andrew J. Dotterweich
by William B. Jaspert.
Attorney.

Patented Jan. 10, 1933

1,893,933

UNITED STATES PATENT OFFICE

ANDREW J. DOTTERWEICH, OF PITTSBURGH, PENNSYLVANIA, ASSIGNOR TO AUTOMATIC WATER SOFTENER COMPANY, OF PITTSBURGH, PENNSYLVANIA, A CORPORATION OF DELAWARE

WATER SOFTENING APPARATUS

Application filed June 7, 1929. Serial No. 369,149.

This invention relates to water softening apparatus of the automatic type embodying a softener tank, brine tank together with the inter-connecting piping system and means for controlling the flow of water to and from the softener.

It is among the objects of this invention to provide an automatic water softening system which will soften water, regenerate the softening material, flush out the regenerating material and restore the system to its softening operation having means of initiating the regenerating cycle either manually at predetermined intervals or in accordance with the character of the water flowing through the system.

Another object of the invention is the provision of means for regulating the flow of raw water whereby the softening material is efficiently utilized and means whereby the flow of water is controlled to prevent the softening material from being carried over the drain or to the soft water lines due to the rate of flow of the water passing through the softener.

Another object of the invention is the provision of means for adapting the softening apparatus to deliver softened water at rates of flow beyond the normal limits of the softener as determined by the weight of the softening material and the available free board space for the expansion of the material in the softening tank.

Another object of this invention is the provision of means for controlling the flow of regenerating material through the softener to assure complete regeneration of the softening material and to provide means for flushing out all of the regenerating material before restoring the system to normal softening operation.

Another object of the invention is to provide a water softening apparatus which shall embody electrical control means that is responsive to the relative electrical conductivity or character of the water or fluid flowing through said apparatus for regulating the operating mechanism and for conducting the automatic operation of the system.

Another object of the invention is to provide means for utilizing a minimum amount of flush out water for flushing the regenerating material from the softening material or zeolite.

Another object of the invention is to provide means for automatically by-passing raw or untreated water to the point of use during the regeneration cycle and to automatically disconnect the by-pass and restore the flow of softened water to the point of use upon completion of the regeneration cycle.

These and other objects of the invention will become more apparent from a consideration of the accompanying drawing in which like reference characters designate like parts and in which the single figure is a diagrammatic view illustrating a water softening system embodying the principles of this invention.

For the purpose of illustration, the invention is described as embodied in an up-flow water softening system in which softening, regenerating and flushing are all done in an upward direction making use of a free board space above the zeolite bed for expansion of the zeolite.

In an up-flow softener, the weight of the zeolite itself, to a certain extent, determines the maximum rate of flow at which water can be passed through it in an upward direction without the flow of water carrying the zeolite from the softener tank and accordingly means are provided to predetermine this maximum of flow.

In the drawing, A designates a tank for the softening material, such as zeolite; B a tank containing salt from which a brine solution is conducted through a system of piping to the softening tank A to regenerate the softening material when it is no longer fit for softening water; C is a tank which may be designated a receiving tank or an electrode tank into which the regenerating material is discharged from the softening tank during regeneration and through which the duration of the salt application and flush out periods are controlled. D designates a flow regulator through which the water passes from a source of raw water supply and by means of which the volume of water flowing to the system is regulated. E designates the valve mechanism for controlling the flow of brine from the salt tank B to the softener A. F designates a valve mechanism which disconnects the softening tank A from the service line during the regenerating of the softening material and permits the passage of raw water into the softening tank for a purpose to be hereinafter stated. G designates a valve controlling a by-pass connection leading from the raw water supply to the service line, this valve being open during regeneration to maintain a supply of fresh water for use. H designates a drain valve controlling the passage of fluid from the softener to the receiving or electrode tank C, and I designates a pilot valve controlling the drain valve H. J, K, and L designate electrodes which are electrically connected to control the operation of the passage controlling valves to automatically initiate and terminate regeneration of the softening material.

The softening tank A is provided with an inlet and an outlet connection 1 and 2 respectively, and a third connection through a collector 3, fitted with means to prevent passage of zeolite but permitting water to pass from the softener tank, the latter being disposed in what may be termed the free board space above the level of the zeolite which is indicated at 4. The zeolite material is supported upon a partition member 5 having strainer nozzles 6 for distributing the flow of water from the inlet connection 1 from which it is uniformly distributed by a perforated baffle plate 7 into the space between the partition member 5 and from which it is conducted in uniform paths established by the strainer nozzles 6 through the zeolite bed to the collector outlet 2, passing through a perforated baffle member 8 to enter the outlet and thence to the valve F from which it is conducted through a service line 9 to the point of use.

The free board space from the line 4 to the top of tank A permits expansion of the softening material during the softening period, but on account of the free board space, a relatively large volume of flush out water would be required to efficiently flush out the softening material. Provision is made to reduce the amount of flush out water to a minimum, consistent with effective regeneration as will appear in the description of the operation of the apparatus.

The salt tank B is provided with a water supply connection 10 leading from the water supply pipe 11 to the upper portion of the salt tank above the level of the salt indicated at 12. The brine solution is delivered from tank B by passing through a baffle structure 13 to the outlet 14 leading by a pipe 15 to the brine control valve E. The tank B is provided with a drain cock 16 for draining the tank previous to replenishing the salt supply.

The receiving or electrode tank C has an inlet pipe 17 leading from the drain valve H and passing into the upper portion of the tank C, an overflow or vent 19, a siphon 20 and a drain 21. The siphon 20 and drain 21 are respectively provided with valves 22 and 23. The siphon 20 extends to the lower portion of the receiving tank as indicated in dotted lines to insure the filling of tank C to a point above the uppermost carbon contact of electrode L before water passes to the drain through pipe 20, the drain pipe 21 being closed by valve 23. By slightly closing valve 22 it is practical to keep tank C filled to the desired level during the period of regeneration, setting the valve in a position where the volume of brine entering through pipe 17 is equal to the discharge through pipe 20. When desired, valve 23 provides a means to completely drain tank C. The electrodes L in the receiving tank constitute carbon members electrically connected to a source of electrical current at 24 and insulated from tank C by a bushing 25. Tank C is provided with an electrical ground connection 25a.

The connecting system of piping for the apparatus consists of a raw water supply pipe 26 which is coupled to a connector 27 in which the electrode J is disposed, the latter being electrically connected through a conductor 28 to a solenoid winding generally designated at 29. A connection 30 leads from the connector 27 to the flow regulator D and an auxiliary by-pass connection 31 leads to the upper chamber of the flow regulator D. The by-pass connector is provided with a valve 32 for obtaining a flow of raw water in excess to the volume controlled by flow regulator D.

Disposed within the flow regulator is a rod 33 held in axial alinement at the top by a guide 34 and provided with a weighted plunger 35 for maintaining its proper position in the casing with respect to a given rate of flow. The plunger 35 is operated in a cylinder 36 to retard and steady the movement of the rod 33 as effected by the current of water flowing past the disk or leaking piston member 37. The casing D is further provided with a constricted portion 38 that cooperates with a choke member 39 secured to the rod 33 to regulate the flow of raw water to the system.

The choke 39 is movable vertically in accordance with the displacement of the rod 33 effected by the flow of water against the piston 37. Choke 39 is of smaller diameter than the constricted portion 38 to permit water to flow around it at low rates of flow without appreciably affecting the position of rod 33. The upper position of rod 33 is limited by a stop 39a which fixes the position of choke 39 in the constricted portion 38 of casing D. Stop 39a may be of glass to make rod 33 visible to the operator. When the water passing from the raw water supply line 26 to the softening apparatus is flowing at normal rate for which the system is designed, choke member 39 will have a lowered position as shown in the drawing, and as the flow is increased, the force exerted against piston 37 will cause the rod 33 to rise bringing the choke member 39 near the constricted portion 38 of the casing in proportion to the rate of flow until rod 33 strikes stop 39a, thereby cutting down the volume flowing through the regulator whereby a predetermined maximum flow is established in the system.

The flow regulator is connected by a pipe line 40 having the branch 11 leading to a connector 42, the line 40 extending to the valve G to constitute a by-pass for fresh water when the softener is regenerating. The branch 11 is provided with a branch line 43 leading to the valve F whereby raw water is conducted through the outlet 2 of the softening tank to the interior of the tank as will be hereinafter explained.

The connector 42 has a constricted or choke portion 44 to cause a flow of salt solution from the salting tank B to the softener tank A during the salting period and has a pipe connection 45 leading to the valve E. On account of the connections of the salt tank B and the valve E with the raw water supply line 11 through lines 10 and 45, the flow of salt solution and raw water to the mixing valve E is in proportion to the areas of the constricted passage 44 and salt line 15. To vary the relative flow of salt solution and raw water for the purpose of varying the concentration of the salt solution passing to the softener, a by-pass connection 107 is provided for the raw water supply to valve E and a manually operative valve 108 is provided to regulate the flow through the by-pass. Valve E is operated by a solenoid 46. The casing of valve E is provided with a constricted portion 47 which cooperates with a weighted choke 48 to reduce the flow during the regenerating operation. Choke 48 is connected to the valve stem which in its raised position during salting lifts the plunger to the constricted passage 47 thereby reducing the rate of flow. The valve stem on account of its weight seats the valve when solenoid 46 is de-energized.

Valve E is provided with a movable armature 46a which is actuated by solenoid 46 in the valve opening movement and the armature 46a may be provided with a handle 47a to manually operate valve E.

Valve E is connected by a coupling 49 to a coil 50 constructed of an insulating material and tubular in shape. The other end of coil 50 is connected by a coupling 51 to a pipe line 52 leading to the inlet 1 of the softening tank. The coil 50 constitutes in effect the secondary winding on a transformer core 53 and is provided with a shunt 54 having terminals 55 and 56 disposed in the path of the fluid in the coil to form a shunt circuit with the salt solution flowing therethrough for producing a dead short on the primary winding 57 of the transformer core.

The primary winding 57 is part of a circuit connected to the solenoid 46 and to contacts 58 and 59. The contacts 58—59 are adapted to be closed by a push button switch 60 to fully energize solenoid 46 of valve E from a source of electrical energy supplied by conductor 24. The winding 57 is also connected by conductors 63 and 66 to a pair of contacts 64 and 65 of a relay, the windings 29 of which are connected to the electrodes J and K, as well as to the source of electrical energy. The closing of contacts 64 and 65 also serves to control energizing solenoid 46 of valve E.

With raw water passing through coil 50 and with an electrical current applied to the primary winding 57, there will be a very little current drawn through primary windings 57 over the amount required to off-set the iron and copper losses of the transformer system due to the high electrical resistance of the short circuited secondary 50. When, however, a salt solution which is of low electrical resistance, is passing through coil 50 short circuited by the shunt connection 54, the condition produced is equivalent to the short circuiting of the primary winding 57 and therefore winding 57 offers little resistance to the flow of an electric current of sufficient strength to solenoid 46 to hold armature 46a in an attracted position.

The valve F which cuts off the service line 9 from the softening tank during regeneration is provided with a passage 67 controlled by valve 68 and a passage 69 and passage 71 controlled by a valve 72, the latter valve being operated by a solenoid 73. The valves 68 and a piston 70 are secured to a common stem 74 that is biased by a coil spring 75 to normally maintain the valve 68 in its open position whereby the passage of the water from the softening tank to the service line is permitted. When the solenoid 73 is energized, the valve 72 is raised from its seat permitting the flow of raw water through the passage 71 against the relatively large area of piston 70 causing the latter to be displaced to close passage 67 leading to the service line and permitting the flow of raw water from the pipe line 43 to the top outlet 2 and into the water softening tank A.

The drain valve and pilot valve H and I are connected by pipe 76 and the drain valve is connected by pipe 77 to the collector 3 disposed within the softening tank.

A by-pass line 125 is connected at one end to the delivery side of tank A at outlet 2 and at its other end to pipe 77 leading from the collector 3 to drain valve H. A check valve 127 is connected in the by-pass 125 to limit flow in one direction as indicated by an arrow and a manually operative valve 126 is also placed in line 125 to control the rate of flow through this by-pass. Another valve 128 is connected in the discharge line of the softener for a purpose hereinafter stated.

The drain valve H is provided with a plurality of leaky pistons 78 which constitute a resistance to the flow through the valve chamber to the pilot valve I when the latter is open, such resistance being effective in lifting the drain valve from its seat and permitting the flow of fluid from the line 77 to the pipe 17 leading to the receiving tank C. The pilot valve I is actuated by a solenoid 79 one side of which is electrically connected to the power circuit, as shown, to which is also connected a solenoid 80 operating the by-pass valve G. Solenoids 73, 79 and 80 are connected in parallel together and as a whole are connected in series with the parallel connection of the solenoid 46 controlling the valve E and the electrode L of the receiving tank so that when the current is grounded through the electrode L of the receiving tank, the solenoid 46 of valve E is deenergized to close the brine valve and the solenoids 73, 79 and 80 are maintained in the circuit to hold their respective valves in open position during the flush out period.

A by-pass 76a controlled by valve 76b is connected across branches 76 and 81 of valve I to manually operate the drain valve H when the electrical circuit is not employed for the operation of regeneration. When valve 76b is opened a flow is established through connection 77 around the leaky pistons 78 through the by-pass 76a to line 81 and the apparatus will otherwise function as when control valve I is operated.

The pilot valve I drains through the pipe 81 to a receptacle 82 showing a drain 83 and an overflow 84, the receptacle being carried by a lever 85 pivoted at 86 and biased by a coil spring 87 to maintain a horizontal position when the receptacle 82 is empty; the other end of the lever 85 is provided with an electrical contact 88 making contact with terminals 89 of the circuit in which the relay 29 is connected, these contacts being broken when the lever 85 is unbalanced by liquid filling the receptacle 82, as will be hereinafter explained.

The operation of the water softening system is briefly as follows: During the normal use or softening period of the apparatus, raw water is supplied from the line 26 through the flow regulator D and with the solenoid control valves in their closed position, the water supply will pass through the line 11 to the connector 42 through the casing of valve E to the coil 50 to the line 52 to the inlet valve 1 into the space below the zeolite bed of tank A, thence through the strainer nozzles 6 in equally divided paths upwardly through the zeolite bed, which by virtue of the flow is raised upwardly to fill a portion of the free board space in the upper end of the tank, thence the softened water takes a divided path through baffle 8 to outlet 2 and through collector 3, by-pass 125 to passage 67, to service line 9, to use.

By utilizing flow regulator D in conjunction with valve 32, the rate of flow through the softener A may be regulated independently of the head on the discharge side of the softener as the regulator D provides for a maximum flow independent of water pressure without loss of zeolite and consistent with efficient softening. If for example, regulator D is designed for 100 gallons flow per minute, and the capacity of softener A is 150 gallons per minute, the full capacity of the softener may be obtained by passing an additional 50 gallons through by-pass 31. After valve 32 is set to by-pass any given volume, such volume is maintained as a maximum by regulator D for that particular setting. To aid the operator in determining proper rate of flow it is advisable to make the stop 39a of the regulator D of glass so that rod 33 projecting therein will indicate the relative position of choke 39 with respect to the constricted portion 38 of the casing.

Leading from the flow control D water passing through pipe 40 takes a divided path to the by-pass valve G through line 43 to pilot valve 72 controlling soft water valve F, and the pipe 11 leading to the connection 42 to the softener tank A and to the salt tank B.

As previously stated, there is a free board space above the line 4 of the zeolite bed which permits the bed to expand during the softening period, however, if no means were employed as herein described, there would be an excessive amount of flush-out water required to displace or get rid of the brine during regeneration due to the diluting action of the water and salt or brine solution, thus decreasing the capacity of the softener.

To overcome this difficulty and still maintain the free board space, a small quantity of raw water is permitted to enter the softener at the opening 2 during the period when salt is being introduced into tank A through the bottom connection 1, and also during the salt flushout period. With this arrangement it will be noted that there is a current of water passing downwardly from 2 to collectors 3 at the same time that a fluid is passing upwardly from 1 through strainer plate 5 and to the collector 3 thus preventing the salt or brine solution from reaching a point above collector 3 thereby avoiding the excessive amount of diluting water required if such counterflow means were not utilized.

To further aid in securing maximum efficiency in the cycle of regeneration, it is desirable to lower the rate of flow during the salting period so as not to expand or appreciably disturb the zeolite bed. After salting, brine solution may be flushed out at a rate of flow considerably in excess of the salting rate. This salting at a low rate and flushing out at a higher rate of flow results in a minimum amount of water being required to regenerate the softener and further a much higher working efficiency of the softener as a whole is obtained.

During the salting operation, valve mechanism E controlling the flow of brine from the salt tank B to the softener A is brought into operation by means of an electric current of sufficient operating strength being applied to the solenoid 46. Application of an electric current to solenoid 46 causes armature 103 to be raised which in turn opens port 104 and draws choke 48 into nozzle 47 by means of the rod 105 to which both the valve and choke are connected. The drawing of the choke 48 into nozzle 47 serves to restrict the opening of port 47 and thus cuts down the rate of flow during the salting operation.

During the period at which salt solution is passing through the softener, water passes through pipe line 11 to the fitting 42 having in it the restricted opening 44, the water taking a divided path through pipe 45 to valve mechanism E as well as to the salt tank B through pipe 10. The restricted opening 44 causes a certain portion of the water to pass through pipe 10 leading to the salt tank, driving an equal volume of salt solution from the brine tank B through the pipe line 15 to the chamber of valve E where the water passing through pipe 45 and this solution from the salt tank are mixed before passing to the softener tank A.

Inasmuch as the relative area of the restricted opening 44 and the opening of pipe 15 control the proportions of salt solution and raw water passing to the softener, it is obvious that any change in the areas of these two ports will result in a change of the degree of salt concentration of the salt solution, and therefore by means of the by-pass 107 and valve 108, it is possible to vary the volume of water passing through pipe 45 so that any desired concentration of salt solution may be conducted to the softener tank A.

Valve F serves to disconnect the softener tank A from the service line during the regeneration of the softening material and also permits the passage of raw water into the softening tank. During the softening period, water passes from the softening material through the outlet 2 and by-pass 125 to valve mechanism F, thence through port 67 to use at 9. Upon electric current of sufficient strength being applied to solenoid 73, armature 109 withdraws valve 72 from its seat at 71. This opening sets up flow of water through pipe 43 against piston member 70 which by its attachment to valve 68, causes the latter to close on its seat 67 against the resistance of spring 75. Piston member 70 consists of a loosely fitting piston within the cylinder wall 110 so that with water pressure applied against the area of the piston 70, there will be a loss in head pressure caused by the increase in velocity due to water passing around the piston, causing piston member 70 to move to a position holding valve 68 against its seat 67. Water passing around piston member 70 then passes to inlet 2 of the softener tank A continuing to flow as long as the valve 72 is off its seat. Upon completion of regeneration, electric current of sufficient strength is removed from solenoid winding 73 which causes valve 72 to close, cutting off the flow of water through this path. With the pressure against piston member 72 removed, the compressed spring 75 displaces valve 68 to open the port 67 and moves piston member 70 to stop 111.

As previously pointed out in connection with the description of the flow regulator D the rate of flow through the softener is limited by the expansion of the zeolite bed to within the limits where the zeolite grains will not be carried over to the soft water line. By the use of by-pass 125 and the valves 126 and 128 the softener is operated with two discharge outlets for softened water to meet specific requirements for any particular zeolite. Thus, where the rate of flow of the incoming hard water at 1 is excessive for the weight of the zeolite bed, part of the outgoing water may be discharged through collector 3 through by-pass line 125 to use, and the balance through outlet 2 to use. Valves 126 and 128 may be adjusted to obtain any desired division of flow through these divided paths to the point of use so that no zeolite will be carried from the softener tank at 2 nor will the rate of discharge at 3 be excessive even though the rate of flow through the softener may be above the rates of flow for a given sectional area as is common practice at present.

So long as softened water is being delivered past electrode K to use, having different characteristics or electrical conductivity than the inlet waters at 26 determined by the electrode J, the differential winding of relay 29 operates to retain contacts 64 and 65 open. However, at such time as the water passing electrode K is of the same character or electrical conductivity as the water passing electrode J, the magnetic force acting by reason of an unbalanced circuit in this relay 29, draws the armature 135 upward thus closing the contacts 64 and 65 and establishing an electrical circuit.

With a circuit established through contacts 64 and 65, electric current of sufficient strength flows to energize solenoid 46 of valve E to open passage 104 to salt tank B. In addition, an electric circuit of sufficient strength is established with solenoid 80 controlling the by-pass valve G, also through the solenoid 73 controlling the valve mechanism F and further through solenoid 79 controlling the pilot valve I, operating the same respectively as heretofore described.

Under such conditions, raw water passes from the inlet 26 to by-pass valve G and thence to use, water passing in this course throughout the entire cycle of regeneration. Water also passes from the inlet 26 through piping 43 through open port 71 causing soft water port 67 to be closed and then passes downwardly through tank A to collector 3 and in combination with the brine solution passing upwardly to the collector 3 passes to the drain through the receiving tank C.

As heretofore described, the receptacle 82 is filled through piping 81 leading from the open port 131 of pilot valve I controlling drain valve H, this filling of receptacle 82 being more or less of a retarded action before contacts 89 are open sufficiently long to permit salt solution to be already in contact with electrodes 55 and 56 to establish the short circuit on the secondary of the transformer as heretofore described.

Gradually the receptacle 82 becomes filled whereby contacts 89 are broken and with the breaking of these contacts which are in parallel with manual starting contacts 58 and 59, and the winding 57 of the transformer, electrical current of sufficient strength passes through the winding 57 to hold port 104 open by the current passing through the solenoid winding 46.

Under conditions when fresh water is passing through tubing 50, there is no appreciable increase in the current drawn through winding 57 over and above the necessary current required to supply the copper and iron losses of the transformer. However, under conditions when a salt solution is passing through coil 50, which salt solution is of very low electrical resistance, an electric short circuit is established across the coil 50 around the core 53 in combination with the electrodes 55 and 56 connected together by means of connection 54. Such a short circuit is in effect similar to a short circuit across the terminals of the primary winding 57 and on account of the low resistance through this winding by reason of such a short circuiting action, enough current is permitted to pass to retain solenoid 46 in open position to pass until a salt solution in sufficient volume passes through the softener tank and contacts with electrode L contained in the receiving tank.

With salt or brine in the receiving tank C, the electric circuit is now from the source of supply or electrical energy through solenoid winding 80 of valve G, solenoid winding 73 of valve mechanism F and solenoid winding 79 of pilot valve I, direct to electrode L, causing salt valve E to seat by action of gravity to terminate flow of brine to the softener.

With the electric current reduced on the salt valve E, port 104 is closed and thereby only fresh or flushout water can pass through the piping leading to the inlet of the softener at 1.

Under conditions where salt or brine is in the receiving tank C, the electric circuit controlling valves G, E and I remains energized leaving said valves in their open position so long as the brine or salt solution is of sufficient strength to be electrically conductive to operate these valves after which with a gradually diluting brine water to a point where there is substantially fresh or softener water in receiving tank C, the resistance to the flow of electric current becomes so high that the solenoids of valves G, F and I become sufficiently de-energized to permit these valves to close. With the closing of port 131 of pilot valve I, the water in receptacle 82 will gradually drain out through opening 83 resulting in spring 87 raising receptacle 82 to its upper position and establishing contacts again at 89 for repetition of the cycle of operation when necessary.

It is of course evident that the regenerating cycle may be initiated independently of the character of the water at electrodes J and K by operating push button switch 60.

I claim herein as my invention:

1. A water-softening apparatus comprising a tank having a bed of water-softening material, an inlet connection below said bed, a plurality of outlet connections at different levels above said bed, means for conducting regenerating solution through the inlet connection to said tank, means for discharging regenerating solution through one of said outlet connections which is below the other, and means for conducting raw water to the tank through said other outlet connection during the upflow of regenerating solution through the bed to limit the height to which the regenerating solution rises above the bed.

2. A water-softening apparatus comprising a container having a bed of water-softening material, a solution tank, and a valve-controlled system of conduits whereby in the normal arrangement of the valve means thereof water flows from a source of supply through the container for softening operation and is delivered to service and, in another arrangement of the valve means, regenerating solution is conducted from said tank to the container and caused to flow upwardly through said bed while water from said source is conducted to the container above the bed and flows downwardly toward the bed and the water and regenerating solution are withdrawn from a point between the bed and top of the container and discharged to waste.

3. In a water softening system the combination of a softener tank, having an inlet and an outlet connection at the bottom and top thereof and having another outlet connection intermediate said inlet and first named outlet connections, means for conducting regenerating material through the inlet connection to said tank, and for withdrawing the same through the intermediate outlet connection, and means for conducting raw water through the first named outlet connection to prevent the flow of regenerating material to the upper portion of said softening tank.

4. In a water softening apparatus the combination of a softening tank, of a receiving tank, valves controlling the flow of raw water, regenerating material and flushout water to the softener tank, electrical means for controlling said valves, means for conducting the regenerating material and flush out water from the softening tank to the receiving tank, and an electrode contained in said receiving tank for controlling the electrical operating circuit in accordance with the character of the fluid flowing through said tank.

5. A water softener of the up-flow type having a flow-regulator determining the maximum rate of flow through the softener and having outlets at different positions above the top of the bed of water-softening material connected with a common service pipe and valve means for regulating the division of flow through said connections.

6. A water softener of the up-flow type having a water supply pipe and brine supplying means in connection with its receiving end and service and drain pipes in connection with its delivery end, there being a top outlet connection to the service pipe and another outlet connection between the top outlet and the bed of water-softening material through which the softener discharges to the drain pipe in the regenerating operation, and means for introducing water through said top outlet connection during the regenerating operation.

7. A water softener having a water supply pipe including a coil, means for introducing brine into water flowing through said coil, a normally closed brine valve, an electromagnet for said valve, a circuit including said magnet, a transformer the primary of which is included in said circuit, the said coil being the secondary of said circuit, the resistance of said transformer preventing the passage of sufficient current to effectively energize the magnet, a switch-controlled shunt around the transformer primary whereby sufficient current may be initially passed to energize the magnet effectively, and a short circuit around the transformer secondary adapted to be closed by the brine flowing through said coil, whereby to short the resistance of the transformer and allow sufficient current to pass to the magnet to maintain the same effectively energized during the flow of brine.

In testimony whereof I have hereunto set my hand this 4th day of June, 1929, at Pittsburgh, Pa.

ANDREW J. DOTTERWEICH.